(12) United States Patent
Patil et al.

(10) Patent No.: US 9,045,965 B2
(45) Date of Patent: Jun. 2, 2015

(54) BIODEGRADABLE ACTIVATORS TO GEL SILICA SOL FOR BLOCKING PERMEABILITY

(75) Inventors: Prajakta R. Patil, Pune (IN); Rajendra A. Kalgaonkar, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 322 days.

(21) Appl. No.: 13/461,516

(22) Filed: May 1, 2012

(65) Prior Publication Data

US 2013/0292120 A1    Nov. 7, 2013

(51) Int. Cl.
*E21B 43/22*    (2006.01)
*E21B 33/13*    (2006.01)
*C09K 8/506*    (2006.01)

(52) U.S. Cl.
CPC ............... *E21B 33/13* (2013.01); *C09K 8/506* (2013.01)

(58) Field of Classification Search
None
See application file for complete search history.

(56) References Cited

U.S. PATENT DOCUMENTS

| | | |
|---|---|---|
| 2,281,810 A | 5/1942 | Stone et al. |
| 4,564,070 A | 1/1986 | Norton |
| 4,732,213 A | 3/1988 | Bennett et al. |
| 4,904,304 A | 2/1990 | Watanabe et al. |
| 5,320,171 A | 6/1994 | Laramay |
| 7,013,973 B2 | 3/2006 | Danican et al. |
| 7,458,424 B2 | 12/2008 | Odeh et al. |
| 7,934,557 B2 | 5/2011 | Nguyen |
| 7,954,549 B2 | 6/2011 | Lende et al. |
| 7,964,539 B2 | 6/2011 | Kotlar |
| 2011/0094746 A1 | 4/2011 | Allison et al. |

OTHER PUBLICATIONS

International Search Report and the Written Opinion of the International Searching Authority, International Application No. PCT/US2013/037540, Date of Mailing Jul. 2, 2013.

*Primary Examiner* — Zakiya W Bates
(74) *Attorney, Agent, or Firm* — Holly Soehnge; Baker Botts L.L.P.

(57) ABSTRACT

A method of treating a treatment zone in a well to reduce the permeability of the treatment zone including the steps of: introducing into the treatment zone a water-based treatment fluid comprising: an aqueous silica sol; and a water-soluble chemical activator for gelling the silica sol, wherein the chemical activator is selected from the group consisting of: phytic acid, methylglycinediacetic acid, a water-soluble polyepoxysuccinic acid, salicylic acid, ascorbic acid, tannic acid, and an alkali metal salt or ammonium salt of any of the foregoing; and shutting in treatment zone for at least a sufficient time to allow the treatment fluid to in-situ form a solid gel at a design temperature for the method. Alternatively, a first treatment fluid including the aqueous silica sol and a second treatment fluid including the chemical activator can be introduced into the treatment zone separately, in any order.

20 Claims, No Drawings

BIODEGRADABLE ACTIVATORS TO GEL SILICA SOL FOR BLOCKING PERMEABILITY

TECHNICAL FIELD

The inventions are in the field of producing crude oil or natural gas from subterranean formations. More specifically, the inventions generally relate to reducing the permeability of subterranean formation in a well. This can be useful, for example, for reducing or blocking excessive water production during the production of oil or gas from the well.

BACKGROUND ART

Oil & Gas Wells

In the context of production from a well, oil and gas are understood to refer to crude oil and natural gas. Oil and gas are naturally occurring hydrocarbons in certain subterranean formations.

A subterranean formation is a body of rock that has sufficiently distinctive characteristics and is sufficiently continuous for geologists to describe, map, and name it. In the context of formation evaluation, a subterranean formation refers to the volume of rock seen by a measurement made through a wellbore, as in a log or a well test. These measurements indicate the physical properties of this volume of rock, such as the property of permeability.

A subterranean formation having a sufficient porosity and permeability to store and transmit fluids is sometimes referred to as a reservoir.

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

There are conventional and non-conventional types of reservoirs.

In a conventional reservoir, the hydrocarbons flow to the wellbore in a manner which can be characterized by flow through permeable media, where the permeability may or may not have been altered near the wellbore, or flow through permeable media to a permeable or (conductive), bi-wing fracture placed in the formation. A conventional reservoir typically has a matrix permeability greater than about 1 milliDarcy (equivalent to about 1,000 microDarcy).

A conventional reservoir is usually in a shape that will trap hydrocarbons and that is covered by a relatively impermeable rock, known as cap rock. The cap rock forms a barrier above reservoir rock so that fluids cannot migrate beyond the reservoir. A cap rock capable of being a barrier to fluid migration on a geological time scale has a permeability that is less than about 1 microDarcy. Cap rock is commonly salt, anhydrite, or shale.

In addition, the hydrocarbons located in the reservoir are located vertically based on their density where the movement of one of the reservoir fluid can apply a driving force to another reservoir fluid. Most conventional reservoir rocks are limestone, dolomite, sandstone, or a combination of these.

To produce oil or gas, a well is drilled into a subterranean formation that is an oil or gas reservoir. A well includes a wellhead and at least one wellbore from the wellhead penetrating the earth.

The wellhead is the surface termination of a wellbore, which surface may be on land or on a seabed. A well site or job site is the geographical location of a well head. It may include related facilities, such as a tank battery, separators, compressor stations, heating or other equipment, and fluid pits. If offshore, a well site can include a platform.

Typically, a wellbore must be drilled hundreds or thousands of feet into the earth to reach an oil or gas bearing formation. In general, the greater the depth of the formation, the higher the static temperature and pressure of the formation.

The "wellbore" refers to the drilled hole, including any cased or uncased portions of the well. The "borehole" usually refers to the inside wellbore wall, that is, the rock face or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

Broadly, a zone refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." As used herein, a "treatment zone" refers to an interval of rock along a wellbore into which a well fluid is directed to flow from the wellbore.

Well Servicing and Well Fluids

Generally, well services include a wide variety of operations that may be performed in oil, gas, geothermal, or water wells, such as drilling, cementing, completion, and intervention. These well services are designed to facilitate or enhance the production of desirable fluids such as oil or gas from or through a subterranean formation.

A well service usually involves introducing a well fluid into a well. As used herein, a "well fluid" is a fluid used in a well service. As used herein, a "well fluid" broadly refers to any fluid adapted to be introduced into a well for any purpose. A well fluid can be, for example, a drilling fluid, a cementing composition, a treatment fluid, or a spacer fluid.

Improving Oil/Water Ratio in Production ("Conformance Control")

Water production from oil and gas wells is a widespread problem that causes significant economic drawbacks. High water rates cause a reduction in well productivity, increase operating expenditures, and can completely block production from wells. Controlling and eliminating unwanted water influx into oil or gas wells is a major concern of producers.

The water can be the result of a water-producing zone communicating with the oil or gas producing zone by fractures, high-permeability streaks, fissures, vugs, or the like, or it can be caused by a variety of other occurrences which are well known to those skilled in the art such as water coning, water cresting, bottom water, channeling at the well bore, etc. The water may approach from one or more directions (from below, from the sides, or from above). Usually water is produced at the cost of oil or gas recovery, and, in severe cases, the water influx becomes so great that the oil or gas production is choked off completely.

In enhanced recovery techniques such as water flooding, an aqueous flood or displacement fluid is injected under pressure into an oil containing subterranean formation by way of one or more injection wells. The flow of the aqueous fluid through the formation displaces oil or gas and drives it to one or more producing wells. However, the aqueous displacement fluid tends to flow through the most permeable zones in the subterranean formation, whereby less permeable zones containing oil or gas are bypassed. This uneven flow of the aqueous displacement fluid through the formation reduces the overall yield of hydrocarbons from the formation.

Heretofore, enhanced recovery problems in a subterranean oil containing formation caused by permeability variations therein have been corrected by reducing the permeability of the subterranean formation flow paths. The techniques utilized to accomplish this reduction in the permeability of high permeability zones are sometimes referred to in the art as "conformance control techniques." Decreasing excess water production increases the production water/oil ratio ("WOR"), lowering water-handling cost. Conformance control techniques can extend a well's economic life, increasing return on investment. Oil production increases as water production decreases.

A number of methods for controlling water production from subterranean formations have been proposed. For example, methods include processes designed to block pores or channels within a formation by gelation using polymer materials such as polyvinyl alcohol and polyacrylic acid. See, for example, U.S. Pat. Nos. 7,759,292 and 7,563,750, which are incorporated herein by reference. See also, for example, Great Britain Patent No. GB-A-2399364.

Another method that has been proposed involves introducing a barrier, such as a concrete resin, adjacent to the well bore in order to prevent the movement of water into the bore.

More recently, methods to achieve selective water control without the need for zonal isolation techniques comprising hydrophilic polymers have been proposed. It is thought that the hydrophilicity of the polymer affords the desired selectivity. It leads to preferential partition into those channels and pores of the formation having high levels of water without impairment to oil and gas production.

A drawback with the polymers used for water shut-off treatment is that they are partially unstable at high temperatures (i.e., greater than 110° C.). Also, some polymers have a tendency of precipitation at higher temperature in the presence of acid and saturated heavy brines See US Patent Publication No. 2010/0256023, which is incorporated herein by reference. Exposure to such temperatures and/or chemicals can cause the polymers to decompose and/or degrade thereby nullifying their blocking effect. When this occurs, the formation then has to be re-treated which increases the cost further.

Polyacrylamide is commonly used as one of the polymers in water shut-off. Unfortunately, it is potentially damaging the environment because the acrylamide monomer produced on decomposition of polyacrylamide is known to be a nerve toxin.

There is a continuing need for improved methods for controlling or blocking water production from certain subterranean formations. It would also be desirable for the methods to avoid risking damage the environment.

SUMMARY OF THE INVENTION

This invention provides compositions for blocking, plugging, or sealing a water or gas producing zone of a well. The newly developed conformance system and treatment is based on green and environmentally acceptable chemistry that incorporates nano silica in the form of a silica sol and a chemical activator to gel the silica sol in-situ in a treatment zone of a well. Silica is considered environmentally benign. The chemical activators are non-toxic, biodegradable, and environmentally acceptable. The developed treatment is useful for bottom hole static temperatures of up to at least 300° F.

According to an embodiment, a method of treating a treatment zone in a well to reduce the permeability of the treatment zone is provided, the method including the steps of: (A) introducing into the treatment zone a water-based treatment fluid comprising: (i) an aqueous silica sol; and (ii) a water-soluble chemical activator for gelling the silica sol, wherein the chemical activator is selected from the group consisting of: (a) phytic acid, an alkali metal salt or ammonium salt thereof; (b) methylglycinediacetic acid, an alkali metal salt or ammonium salt thereof; (c) a water-soluble polyepoxysuccinic acid and an alkali metal salt or ammonium salt thereof; and (d) salicylic acid, ascorbic acid, tannic acid, and an alkali metal salt or ammonium salt of any of the foregoing; and (B) shutting in treatment zone for at least a sufficient time to allow the treatment fluid to in-situ form a solid gel at a design temperature for the method.

According to another embodiment, a first treatment fluid comprising the aqueous silica sol and a second treatment fluid comprising the chemical activator can be introduced into the treatment zone separately, in any order, to then mix together and gel in-situ.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION OF PRESENTLY PREFERRED EMBODIMENTS AND BEST MODE

Definitions and Usages

Interpretation

The words or terms used herein have their plain, ordinary meaning in the field of this disclosure, except to the extent explicitly and clearly defined in this disclosure.

If there is any conflict in the usages of a word or term in this disclosure and one or more patent(s) or other documents that may be incorporated by reference, the definitions that are consistent with this specification should be adopted.

Patent Terms

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Terms such as "first," "second," "third," etc. are assigned arbitrarily and are merely intended to differentiate between two or more fluids, elements, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there by any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Well Terms

As used herein, introducing "into a well" means introduced at least into and through the wellhead. According to various techniques known in the art, tubulars, equipment, tools, or well fluids can be directed from the wellhead into any desired portion of the wellbore. Additionally, as used herein, "into a treatment zone" means into and through the wellhead and, additionally, through the wellbore and into the treatment zone.

As used herein, the word "treatment" refers to any treatment for changing a condition of a portion of a wellbore or an adjacent subterranean formation; however, the word "treatment" does not necessarily imply any particular treatment purpose. A treatment usually involves introducing a well fluid for the treatment, in which case it may be referred to as a treatment fluid, into a well. As used herein, a "treatment fluid" is a fluid used in a treatment. Unless the context otherwise requires, the word "treatment" in the term "treatment fluid" does not necessarily imply any particular treatment or action by the fluid.

The term "design temperature" refers to an estimate or measurement of the actual temperature at the down hole environment at the time of a well treatment. That is, design temperature takes into account not only the bottom hole static temperature (which is sometimes abbreviated "BHST"), but also the effect of the temperature of the well fluid on the BHST during treatment. Because treatment fluids may be considerably cooler than BHST, the difference between the two temperatures can be quite large. Ultimately, if left undisturbed, a subterranean formation will return to the BHST.

The near-wellbore region of a zone is usually considered to include the matrix of the rock within a few inches of the borehole. As used herein, the near-wellbore region of a zone is considered to be anywhere within about 12 inches of the wellbore. The far-field region of a zone is usually considered the matrix of the rock that is beyond the near-wellbore region.

Fluid Terms

The physical state or phase of a substance (or mixture of substances) and other physical properties are determined at a temperature of 77° F. (25° C.) and a pressure of 1 atmosphere (Standard Laboratory Conditions) without any applied shear.

As used herein, a fluid is a substance that behaves as a fluid under Standard Laboratory Conditions.

Every fluid inherently has at least a continuous phase. A fluid can have more than one phase. The continuous phase of a well fluid is a liquid under Standard Laboratory Conditions. For example, a well fluid can in the form of be a suspension (solid particles dispersed in a liquid phase), an emulsion (liquid particles dispersed in another liquid phase), or a foam (a gas phase dispersed in liquid phase).

As used herein, a water-based fluid means that water or an aqueous solution is the dominant material, that is, greater than 50% by weight, of the continuous phase of the substance.

In contrast, "oil-based" means that oil is the dominant material by weight of the continuous phase of the substance. In this context, the oil of an oil-based fluid can be any oil. In general, an oil is any substance that is liquid under Standard Laboratory Conditions, is hydrophobic, and soluble in organic solvents. Oils have a high carbon and hydrogen content and are relatively non-polar substances, for example, having a polarity of 3 or less on the Synder polarity index. This general definition includes classes such as petrochemical oils, vegetable oils, and many organic solvents. All oils can be traced back to organic sources.

Solubility

A substance is considered to be "soluble" in a liquid if at least 10 grams of the substance can be dissolved in one liter of the liquid when tested at 77° F. and 1 atmosphere pressure for 2 hours and considered to be "insoluble" if less soluble than this.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified a number of different ways, including based on the size of the dispersed particles, the uniformity or lack of uniformity of the dispersion, whether or not precipitation occurs, and the presence of Brownian motion. For example, a dispersion can be considered to be homogeneous or heterogeneous based on being a solution or not, and if not a solution, based on the size of the dispersed particles (which can refer to droplet size in the case of a dispersed liquid phase).

Classification of Dispersions: Homogeneous and Heterogeneous

A dispersion is considered to be homogeneous if the dispersed particles are dissolved in solution or the particles are less than about 1 nanometer in size. Even if not dissolved, a dispersion is considered to be homogeneous if the dispersed particles are less than about 1 nanometer in size.

A dispersion is considered to be heterogeneous if the dispersed particles are not dissolved and are greater than about 1 nanometer in size. (For reference, the diameter of a molecule of toluene is about 1 nm).

Heterogeneous dispersions can have gas, liquid, or solid as an external phase. An example of a suspension of solid particulate dispersed in a gas phase would be an aerosol, such as smoke. In a case where the dispersed-phase particles are liquid in an external phase that is another liquid, this kind of heterogeneous dispersion is more particularly referred to as an emulsion. Suspensions and emulsions are commonly used as well fluids.

Classification of Homogeneous Dispersions: Solutions

A solution is a special type of homogeneous mixture. A solution is considered homogeneous: (a) because the ratio of solute to solvent is the same throughout the solution; and (b) because solute will never settle out of solution, even under powerful centrifugation, which is due to intermolecular attraction between the solvent and the solute. An aqueous solution, for example, saltwater, is a homogenous solution in which water is the solvent and salt is the solute.

One may also refer to the solvated state, in which a solute ion or molecule is complexed by solvent molecules. A chemical that is dissolved in solution is in a solvated state. Solvation is distinct from dissolution and solubility. Dissolution is a kinetic process, and is quantified by its rate. Solubility quantifies the concentration of the solute at which there is dynamic equilibrium between the rate of dissolution and the rate of precipitation of the solute. Dissolution and solubility can be dependent on temperature and pressure, and may be dependent on other factors, such as salinity or pH of an aqueous phase.

Classification of Heterogeneous Dispersions: Colloids and Suspensions

Heterogeneous dispersions can be further classified based on the dispersed particle size.

A heterogeneous dispersion is a "colloid" where the dispersed particles range up to about 50 micrometer (50,000 nanometers) in size. For example, the dispersed particles of a colloid can have a diameter of between about 4 to about 300 nanometers. Such particles are normally invisible to an optical microscope, though their presence can be confirmed with the use of an ultramicroscope or an electron microscope. In the cases where the external phase of a dispersion is a liquid, for a colloidal fluid the dispersed particles are so small that they do not settle. A liquid dispersed phase in a continuous liquid is referred to as an emulsion. A solid dispersed phase in a continuous liquid phase is referred to as a sol. In some cases, a colloid can be considered as a homogeneous mixture. This is because the distinction between "dissolved" and "particulate" matter can be sometimes a matter of approach, which affects whether or not it is homogeneous or heterogeneous.

A heterogeneous dispersion is a "suspension" where the dispersed particles are larger than about 50 micrometer. Such particles can be seen with a microscope, or if larger than about 50 micrometers (0.05 mm), with the unaided human eye. Unlike colloids, however, the dispersed particles of a suspension in a liquid external phase may eventually separate on standing, e.g., settle in cases where the particles have a higher density than the liquid phase. Suspensions having a liquid external phase are essentially unstable from a thermodynamic point of view; however, they can be kinetically stable over a long period depending on temperature and other conditions.

Gels and Deformation

A gel is formed by a network of interconnected molecules, such as a crosslinked polymer or of micelles. The network gives a gel phase its structure and an apparent yield point. At the molecular level, a gel is a dispersion in which both the network of molecules is continuous and the liquid is continuous. A gel is sometimes considered as a single phase.

Technically, a gel is a semi-solid, jelly-like state or phase that can have properties ranging from soft and weak to hard and tough. Shearing stresses below a certain finite value fail to produce permanent deformation. The minimum shear stress that will produce permanent deformation is known as the shear strength or gel strength of the gel.

Particle Terms

As used herein, "particulate" or "particulate material" refers to matter in the physical form of distinct particles (e.g., not dissolved chemicals in another phase and not aggregated into a solid mass). A particulate is a grouping of particles based on common characteristics, including chemical composition and particle size range, particle size distribution, or median particle size. As used herein, a particulate is a grouping of particles having similar chemical composition and similar particle size ranges anywhere in the range of about 4 nanometers (e.g., molecular scale) to about 3 millimeters (e.g., large grains of sand).

A particulate will have a particle size distribution ("PSD"). As used herein, "the size" of a particulate can be determined by methods known to persons skilled in the art.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means about the mid-point of the industry accepted mesh size range for the particulate.

Particulate smaller than about 400 U.S. Standard Mesh is usually measured or separated according to other methods because small forces such as electrostatic forces can interfere with separating tiny particulate sizes using a wire mesh.

Permeability

Permeability refers to how easily fluids can flow through a material. For example, if the permeability is high, then fluids will flow more easily and more quickly through the material. If the permeability is low, then fluids will flow less easily and more slowly through the material. As used herein, "high permeability" means the material has a permeability of at least 100 milliDarcy (mD). As used herein, "low permeability" means the material has a permeability of less than 1 mD.

Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of the continuous phase of the fluid without the weight of any viscosity-increasing agent, dissolved salt, suspended particulate, or other materials or additives that may be present in the water.

Any doubt regarding whether units are in U.S. or Imperial units, where there is any difference, U.S. units are intended. For example, "gal/Mgal" means U.S. gallons per thousand U.S. gallons.

The micrometer ($\mu$m) may sometimes be referred to herein as a micron.

Biodegradability

Biodegradable means the process by which complex molecules are broken down by micro-organisms to produce simpler compounds. Biodegradation can be either aerobic or anaerobic. Biodegradability is commonly measured on well fluids or their components to ensure that they do not persist in the environment. A variety of tests exist to assess biodegradability.

As used herein, a substance is considered "biodegradable" if the substance passes a ready biodegradability test or an inherent biodegradability test. It is preferred that a substance is first tested for ready biodegradability, and only if the substance does not pass at least one of the ready biodegradability tests then the substance is tested for inherent biodegradability. It is believed that the substance according to the invention will pass the ready biodegradability test and will not need to be tested for inherent biodegradability.

In accordance with Organisation for Economic Co-operation and Development (OECD) guidelines, the following six tests permit the screening of chemicals for ready biodegradability. As used herein, a substance showing more than 60% biodegradability in 28 days according to any one of the six ready biodegradability tests is considered a pass level for classifying it as "readily biodegradable," and it may be assumed that the substance will undergo rapid and ultimate degradation in the environment. The six ready biodegradability tests are: (1) 301A: DOC Die-Away; (2) 301B: CO2 Evolution (Modified Sturm Test); (3) 301C: MITI (I) (Ministry of International Trade and Industry, Japan); (4) 301D: Closed Bottle; (5) 301E: Modified OECD Screening; and (6) 301F: Manometric Respirometry. The six ready biodegradability tests are described below:

For the 301A test, a measured volume of inoculated mineral medium, containing 10 mg to 40 mg dissolved organic carbon per liter (DOC/l) from the substance as the nominal sole source of organic carbon, is aerated in the dark or diffuse light at $22\pm2°$ C. Degradation is followed by DOC analysis at frequent intervals over a 28-day period. The degree of biodegradation is calculated by expressing the concentration of DOC removed (corrected for that in the blank inoculum control) as a percentage of the concentration initially present. Primary biodegradation may also be calculated from supplemental chemical analysis for parent compound made at the beginning and end of incubation.

For the 301B test, a measured volume of inoculated mineral medium, containing 10 mg to 20 mg DOC or total organic carbon per liter from the substance as the nominal sole source of organic carbon is aerated by the passage of carbon dioxide-free air at a controlled rate in the dark or in diffuse light. Degradation is followed over 28 days by determining the carbon dioxide produced. The $CO_2$ is trapped in barium or sodium hydroxide and is measured by titration of the residual hydroxide or as inorganic carbon. The amount of carbon dioxide produced from the test substance (corrected for that derived from the blank inoculum) is expressed as a percentage of $ThCO_2$. The degree of biodegradation may also be calculated from supplemental DOC analysis made at the beginning and end of incubation.

For the 301C test, the oxygen uptake by a stirred solution, or suspension, of the substance in a mineral medium, inoculated with specially grown, unadapted micro-organisms, is measured automatically over a period of 28 days in a darkened, enclosed respirometer at $25+/-1°$ C. Evolved carbon dioxide is absorbed by soda lime. Biodegradation is expressed as the percentage oxygen uptake (corrected for blank uptake) of the theoretical uptake (ThOD). The percentage primary biodegradation is also calculated from supplemental specific chemical analysis made at the beginning and end of incubation, and optionally ultimate biodegradation by DOC analysis.

For the 301D test, a solution of the substance in mineral medium, usually at 2-5 milligrams per liter (mg/l), is inoculated with a relatively small number of micro-organisms from a mixed population and kept in completely full, closed bottles in the dark at constant temperature. Degradation is followed by analysis of dissolved oxygen over a 28 day period. The amount of oxygen taken up by the microbial population during biodegradation of the test substance, corrected for uptake by the blank inoculum run in parallel, is expressed as a percentage of ThOD or, less satisfactorily COD.

For the 301E test, a measured volume of mineral medium containing 10 to 40 mg DOC/l of the substance as the nominal sole source of organic carbon is inoculated with 0.5 ml effluent per liter of medium. The mixture is aerated in the dark or diffused light at $22+2°$ C. Degradation is followed by DOC analysis at frequent intervals over a 28 day period. The degree of biodegradation is calculated by expressing the concentration of DOC removed (corrected for that in the blank inoculums control) as a percentage of the concentration initially present. Primary biodegradation may also be calculated from supplemental chemical analysis for the parent compound made at the beginning and end of incubation.

For the 301F test, a measured volume of inoculated mineral medium, containing 100 mg of the substance per liter giving at least 50 to 100 mg ThOD/l as the nominal sole source of organic carbon, is stirred in a closed flask at a constant temperature ($+1°$ C. or closer) for up to 28 days. The consumption of oxygen is determined either by measuring the quantity of oxygen (produced electrolytically) required to maintain constant gas volume in the respirometer flask or from the change in volume or pressure (or a combination of the two) in the apparatus. Evolved carbon dioxide is absorbed in a solution of potassium hydroxide or another suitable absorbent. The amount of oxygen taken up by the microbial population during biodegradation of the test substance (corrected for uptake by blank inoculum, run in parallel) is expressed as a percentage of ThOD or, less satisfactorily, COD. Optionally, primary biodegradation may also be calculated from supplemental specific chemical analysis made at the beginning and end of incubation, and ultimate biodegradation by DOC analysis.

In accordance with OECD guidelines, the following three tests permit the testing of chemicals for inherent biodegradability. As used herein, a substance with a biodegradation or biodegradation rate of >20% is regarded as "inherently primary biodegradable." A substance with a biodegradation or biodegradation rate of >70% is regarded as "inherently ultimate biodegradable." As used herein, a substance passes the inherent biodegradability test if the substance is either regarded as inherently primary biodegradable or inherently ultimate biodegradable when tested according to any one of three inherent biodegradability tests. The three tests are: (1) 302A: 1981 Modified SCAS Test; (2) 302B: 1992 Zahn-Wellens Test; and (3) 302C: 1981 Modified MITI Test. Inherent biodegradability refers to tests which allow prolonged exposure of the test compound to microorganisms, a more favorable test compound to biomass ratio, and chemical or other conditions which favor biodegradation. The three inherent biodegradability tests are described below:

For the 302A test, activated sludge from a sewage treatment plant is placed in an aeration (SCAS) unit. The substance and settled domestic sewage are added, and the mixture is aerated for 23 hours. The aeration is then stopped, the sludge allowed to settle and the supernatant liquor is removed. The sludge remaining in the aeration chamber is then mixed with a further aliquot of the substance and sewage and the cycle is repeated. Biodegradation is established by determination of the dissolved organic carbon content of the supernatant liquor. This value is compared with that found for the liquor obtained from a control tube dosed with settled sewage only.

For the 302B test, a mixture containing the substance, mineral nutrients, and a relatively large amount of activated sludge in aqueous medium is agitated and aerated at 20° C. to 25° C. in the dark or in diffuse light for up to 28 days. A blank control, containing activated sludge and mineral nutrients but no substance, is run in parallel. The biodegradation process is monitored by determination of DOC (or COD(2)) in filtered samples taken at daily or other time intervals. The ratio of eliminated DOC (or COD), corrected for the blank, after each time interval, to the initial DOC value is expressed as the percentage biodegradation at the sampling time. The percentage biodegradation is plotted against time to give the biodegradation curve.

For the 302C test, an automated closed-system oxygen consumption measuring apparatus (BOD-meter) is used. The substance to be tested is inoculated in the testing vessels with micro-organisms. During the test period, the biochemical oxygen demand is measured continuously by means of a BOD-meter. Biodegradability is calculated on the basis of BOD and supplemental chemical analysis, such as measurement of the dissolved organic carbon concentration, concentration of residual chemicals, etc.

Reducing Permeability of a Treatment Zone

Excessive water production greatly affects the economic life of producing wells. High water cut largely affects the economic life of producing wells and is responsible for many oilfield-related damage mechanisms, such as scale deposition, fines migration, asphaltene precipitation, corrosion, etc. This also leads to increased operating costs to separate, treat, and dispose of the produced water according to environmental regulations. Though a variety of chemicals are used by the industry to control water production, most of them are not accepted in the regions with strict environmental regulations.

According to an embodiment, a method of treating a treatment zone in a well to reduce the permeability of the treatment zone is provided, the method including the steps of: (A) introducing into the treatment zone a water-based treatment fluid comprising: (i) an aqueous silica sol; and (ii) a water-soluble chemical activator for gelling the silica sol, wherein the chemical activator is selected from the group consisting of: (a) phytic acid, an alkali metal salt or ammonium salt thereof; (b) methylglycinediacetic acid, an alkali metal salt or ammonium salt thereof; (c) a water-soluble polyepoxysuccinic acid and an alkali metal salt or ammonium salt thereof; and (d) salicylic acid, ascorbic acid, tannic acid, and an alkali metal salt or ammonium salt of any of the foregoing; and (B) shutting in treatment zone for at least a sufficient time to allow the treatment fluid to in-situ form a solid gel at a design temperature for the method.

According to another embodiment, a first treatment fluid comprising the aqueous silica sol and a second treatment fluid comprising the chemical activator can be introduced into the treatment zone separately, in any order, to then mix together and gel in-situ.

The treatment system is gelled in the zone in-situ with chemical activation. The in-situ gelling of the silica sol can block the pore spaces of the subterranean formation, proppant pack, or gravel pack of the treatment zone. The gelling of the silica sol can be used to reduce the permeability of the subterranean formation, proppant pack, or gravel pack of the treatment zone.

Introducing the silica sol into a formation and activating it does no damage to the formation, which would otherwise occur with the use of treatments involving polymers.

The invention can provide two important benefits: (1) reducing permeability; and (2) using a natural mineral (silica) and biodegradable chemical activators that are friendly to the environment or "green" in nature.

In an embodiment, the zone is a water-producing zone. The method can be used to control water production from the zone, thereby promoting hydrocarbon production. In an embodiment, the methods can be used for reducing or shutting off water production from a zone in a well.

Silica Sols and Gelling

Dispersions of colloidal particles that are readily commercially available include oxides of silicon, aluminum, antimony, tin, cerium, yttrium and zirconium. The particles are mostly spherical with particles sizes usually ranging from about 4 nm to about 250 nm, but elongated particles, with a length up to 300 nm are also available and believed to be acceptable for use in the methods of this invention. The particles may have a negative or positive charge, which electrostatic charges help keep the particles dispersed in the liquid continuous phase. The colloidal dispersion is handled as a liquid, which appears transparent in the case of relatively low concentration of particles, becoming opalescent or milky at higher concentration.

The oxide of silicon is silicon dioxide ($SiO_2$), which is more commonly known as silica. Silica is the most common material in the Earth's crust, occurring as sandstone or sand. Dispersions of silica, commonly referred to as silica sols, are widely commercially available and relatively inexpensive. Silica sols are commonly available at concentrations ranging between 1 wt % and 70 wt %. In any case, the dispersion may be handled as a liquid, which greatly simplifies its use in the forming of well fluids.

Silica sols are stable at a pH between about 8 to about 12. Commercially available silica sols commonly have a pH in the range of about 9.5 to about 10.5. This stability is mainly because of silica-particle repulsion resulting from surface ionization in alkaline solution.

There is no interaction of silica sol with hydrocarbon liquids. Silica sol is a non-combustible material. The product is stable under normal conditions of storage and reactivity. It can have a dangerous chemical reaction with powerful oxidants, however. It is non-toxic product, giving only light irritation in contact with eye or skin. Silica sol has NFPA ratings of Fire 0, Health 1, and Reactivity 0. It has no hazardous decomposition products.

These characteristics make silica sols easy to transport and store on field locations without posing safety hazards.

Freezing temperatures cause crystals of ice to form in colloidal silica solutions, which increases the concentration of silica in the unfrozen portion and accelerates gelation of the silica-rich fraction. On thawing, the gelled silica does not redisperse but remains as a sediment. As a result, the melted material also contains a reduced concentration of dispersed silica particles and is usually unsuitable for use. Irreversible gelation of colloidal silica at temperatures below 0° C. can be prevented by mixing the colloidal silica solution with an anti-freeze for water, more technically known as a free-point depressant. Common examples of freeze-point depressants include ethylene glycol, propylene glycol, or methanol, which can be included in a silica sol at a concentration comprising from 0.1 wt % to 10 wt %, preferentially between 0.1 wt % and 5 wt %, depending on the freeze point depression desired.

Gelling of Silica Sols

The electrical repulsion between the same charged particles stabilizes the dispersion. Disturbance of the charge balance, for instance by removing the water, changing the pH, adding salt, or adding water-miscible organic solvent, can cause the colloidal particles to aggregate, resulting in the formation of a gel.

Gelling of the non-aggregated colloidal silica sol results in a semi-solid or solid gel, which can be used to plug the formation interstices. Indeed, after water shut off according to the invention, a portion of the formation that before treatment exhibits excessive water production can be plugged to a retained permeability of less than 0.1 percent.

Gelling and gelling time can be affected by a number of factors. For example, without being bound by any theory, it is believed that upon the addition of a pH modifier or an ionic-strength modifier, the inter-particle collision rate is increased and siloxane bonds (Si—O—Si) are formed.

Both low and high pHs can cause long gelling times and intermediate pHs shorter gelling times. Generally, the pH upon initial injection into the treatment zone should be between 8 to 12. Buffers can be added, if desired, to adjust the initial pH or to help keep the pH of the solution within a desired range. Once the aqueous solution of the colloidal silica sol has been gelled, the pH can be varied between 1 or less and about 10 without significantly affecting gel properties. Thus, treatment of the well with HCl can be effected without dissolving the gel used to plug the leak or the permeable zone.

The total ionic strength of the colloidal silica sol also will affect gelling. In general, the total ionic strength should be less than about 10, preferably less than 3.5, and most preferably 0.75 or less (seawater is about 0.72). Inorganic ions such as potassium, sodium, magnesium, calcium, chloride, sulfate, bisulfate, carbonate, or bicarbonate may be present naturally in the water used to prepare the solution, or they may be added intentionally so as to adjust the ionic strength. Divalent or multivalent cations have a greater effect on gel time than their contribution to ionic strength would indicate. In field operations, the ionic strength of the treatment solution is one variable that can be adjusted to achieve a desired gel time. However, to minimize the possibility of interaction with the formation or formation waters, a slug of a brine of appropriate ionic composition may be injected as a preflush. (For a definition of ionic strength, see W. J. Moore, Physical Chemistry, 4th edition, Prentice Hall, Inc., New Jersey, 1972, pg. 443.) Once the silica sol has been gelled, the gel integrity will not be affected on being contacted with water or brines.

Smaller particle size can promote faster gelling of the non-aggregated colloidal silica sol. Not only is particle size of the colloidal silica sol a factor in the rate at which the colloidal silica gel is formed, so is the concentration of the colloidal silica sol in the aqueous solution. Higher concentration of silica sol in the aqueous solution promotes higher gelling rates.

The temperature of the aqueous solution of the silica sol also affects the formation of the colloidal silica gel; higher temperatures generally favoring more rapid gelling. Gels can be formed from the aqueous non-aggregated colloidal silica sols at temperatures from 5° C. to 200° C. or higher. Such gels are stable indefinitely at temperatures between 5° C. and 200° C. and are stable for a few days at temperatures as high as 260° C. In addition, because of the exceptionally low permeability, silica gels can withstand contact by fluids having temperatures as high as 350° C., e.g., steam.

From the time that the treatment fluid begins to gel, the shear strength of fluid increases over a period of time. The mechanical strength of gelled silica sols may increase over a period of several days. A higher temperature may promote the development of higher shear strength and higher ultimate mechanical strength.

The foregoing gelling factors do not function independently of one another; they act in concert. For example, at pH greater than about 10, high ionic strengths can cause colloidal silica solutions to separate into a clear, aqueous layer and a turbid, silica-rich layer instead of forming a space-filling gel. At lower pH's, however, gels form in the presence of much higher ionic strengths.

Selecting Silica Sol for Treatment Applications

Silica sols with particle sizes ranging between about 4 nanometers and about 100 nanometers have been found to have an excellent injectivity in formations with permeabilities as low as 1 mD. This unique property allows a treatment of the formation to a desired depth from the wellbore. Preferably, the silica particles are less than 40 nanometers. Most preferably, the colloidal particles have a size between 4 and 22 nanometers.

In general, silica sol concentrations in the range between 1 and 70 weight percent colloidal silica can be used. Commercial silica sols are typically available at concentrations running between 30 and 50 weight percent. Commercial sols can be used at such high concentrations or diluted to a lower silica content, depending on the treatment design criteria. For example, sols containing between 5 wt % of silica as a lower limit and 50 wt % of silica as an upper limit are generally used for the purposes of this invention, but may be diluted down to 2 wt % where a hard gel is not necessary. Note that the volume of injected solution typically remains the same when diluted solutions are used but a gel of less rigidity is obtained.

For example, sols containing 2 to 40 weight percent of silica are generally used for the purposes of this invention. Typically, the sol is diluted to have in the range of 5 to 15 weight percent silica for use according to the invention. However, colloidal silica concentrations may vary with the use to which the colloidal silica solutions of the invention are put. For example, when plugging casing leaks, the solutions will contain between 6 and 15 weight percent colloidal silica. When one is plugging a large thief zone, the bulk of the solution used for plugging regions significantly removed from the wellbore will contain 2 to 7.5 weight percent colloidal silica, preferably 4 to 6 weight percent. That portion of the solution that is used to treat regions of the thief zone which are not far removed from the wellbore will contain 7.5 to 15 weight percent colloidal silica, preferably 7.5 to 10.

The desired gel time will vary depending upon the circumstances. If, for example, one wishes to block a casing leak or plug a formation that is at or near the wellbore, or if the aqueous solution of the colloidal silica sol can be pumped into the desired part of the formation rapidly, e.g., through a fracture, then short gel times, e.g., ranging from a few minutes to 12 hours, are desired. If on the other hand the portion of the formation which is to be blocked includes regions far from the wellbore, long gel times are needed, e.g., from days to weeks. The present invention makes possible both short gel times and very long ones. When long gel times are needed, ideally one should vary the gel time of the compositions being injected into the formation so that the last portion of the aqueous solution of non-aggregated colloidal silica sol to be injected into the formation will gel at nearly the same time as, or soon after, the first portion gels. The present invention permits tailoring gel times so as to permit one to effectively deal with just that type of situation.

Chemical Activators to Help Control Gelling of Silica Sol

In addition to the forgoing factors for controlling the gelling and gel time of a silica sol, a chemical activator for use according to the invention should be, in order of priority: (a) selected from the group consisting of organophosphonates, aminocarboxylic acids, hydroxypolycarboxylates, phenolic acid, polyphenolic acid, ascorbic acid, and an alkali metal salt or ammonium salt of any of the forgoing; (b) selected for being water soluble; (c) selected for being biodegradable, preferably for passing at least one of the ready biodegradability tests; (d) selected for being of a natural plant product; and (e) of relatively low cost.

More preferably, one or more of the following chemical activators can be used to cause or help control gelling of a silica sol:
(a) phytic acid, and an alkali metal salt or ammonium salt thereof;
(b) methylglycinediacetic acid, and an alkali metal salt or ammonium salt thereof;
(c) a water-soluble polyepoxysuccinic acid, and an alkali metal salt or ammonium salt thereof; and
(d) salicylic acid, ascorbic acid, tannic acid, and an alkali metal salt or ammonium salt of any of the foregoing.

It is believed that all of these chemical activators are biodegradable, and, most likely, would pass at least one of the tests for ready biodegradability.

Phytic acid is an organophosphonate that is naturally found in hulls of nuts, seeds and grains. The chemical structure of phytic acid is:

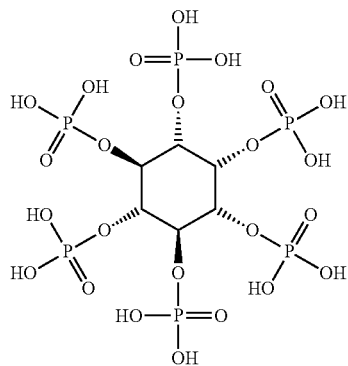

The structure of methylglycinediacetic acid (sometimes referred to as "MGDA" or a-alaninediacetic acid) is shown below:

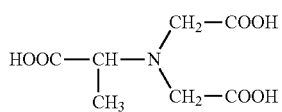

The structure of suitable water-soluble polyepoxysuccinic acids and their derivatives is represented below:

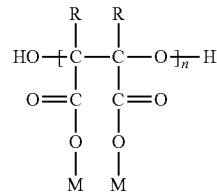

Notes: $n = 2\text{-}10$
M: $Na^+$ or $H^+$, $K^+$, $NH_4^+$
R: H or $C_{1\text{-}4}$ alkyl In presence of activators described in this invention, the particle collision of nano silica causes the aggregation into long chain-like networks and forms the gel. This particle collision is possible by increasing the temperature and reducing pH of stable alkaline solution. Collision of particles forms the bonding that might be caused by formation of siloxane (Si—O—Si) bonds at inter-particle contacts. This bonding is believed to be catalyzed by hydroxide ions. Gelation is the time when particle aggregates complete and forms uniform three-dimensional networks of long, bead-like strings of silica particles.

The nano silica gelling can be at least partially controlled by varying the concentration of such a chemical activator.

The gelling tendency of the system can be accelerated by changing the pH of the system from basic to acidic. In a moderately acidic pH range, the rate of the gel formation is increased (but not in a highly acidic pH range).

In addition, these activators show no precipitation with nano silica after mixing or at elevated temperatures.

Without being limited by any theory, the chemical activators used according to the invention are believed to not thermally hydrolyze or thermally decompose at a design temperature for the method of treating to release an acid or base.

Gelling of Silica Sol in Well Environment

The gelation of a silica sol is irreversible. It is believed that a fully gelled silica sol is relatively stable and inert, even to additional chemical activator. Thus, a gelled silica sol is stable and inert in a well environment.

The gelation of a silica sol can be utilized for reducing the permeability of a subterranean formation. This can be used, for example, as efficient conformance product and method for plugging or sealing water or gas producing zones in a well.

The system and methods are based on "green" chemicals providing environmental advantage over other approaches to the problem.

Well Fluid Additives

A well fluid according to the invention can contain additives that are commonly used in oil field applications, as known to those skilled in the art, provided any such additive does not adversely affect the chemistry of the system according to the invention. For example, these include, but are not necessarily limited to, brines, inorganic water-soluble salts, salt substitutes (such as trimethyl ammonium chloride), pH control additives, surfactants, viscosity-increasing agents, breakers, breaker aids, oxygen scavengers, alcohols, scale inhibitors, corrosion inhibitors, hydrate inhibitors, fluid-loss control additives, oxidizers, chelating agents, clay stabilizers, sulfide scavengers, fibers, bactericides, and combinations thereof.

The use of any well fluid additive with the invention should be compatible with the silica sol and chemical activator and with the subterranean formation.

As dissolved divalent or multivalent ions may interfere with the chemical activator, in an embodiment, the continuous aqueous phase of the water-based treatment fluid has an ionic strength less than 0.75. In another embodiment, the continuous aqueous phase of the water-based treatment fluid comprises dissolved divalent and multivalent cations in a total concentration that is stoichiometrically less than 50% that of the concentration of any first and second carboxylic acid functional groups of the chemical activator. Preferably, the continuous aqueous phase of the water-based treatment fluid comprises dissolved divalent and multivalent cations in a total concentration that is stoichiometrically less than 5% that of any first and second carboxylic acid functional groups of the chemical activator. More preferably, the continuous aqueous phase of the water-based treatment fluid comprises dissolved divalent and multivalent cations in a total concentration that is stoichiometrically less than 1% that of any first and second carboxylic acid functional groups of the chemical activator.

According to an embodiment, the treatment fluid is not a hydraulic cementing composition and does not include any hydraulic cement.

Method Steps

In general, a method of treating a treatment zone in a well is provided. The method includes the step of introducing into the treatment zone: (a) a silica sol; and (b) a chemical activator for gelling the silica sol. The silica sol and the chemical activator can be introduced into the treatment zone according to any convenient techniques for introducing particulates and chemicals that are known in the field.

According to an embodiment, a method of treating a treatment zone in a well to reduce the permeability of the treatment zone is provided, the method including the steps of: (A) introducing into the treatment zone a water-based treatment fluid comprising: (i) an aqueous silica sol; and (ii) a water-soluble chemical activator for gelling the silica sol, wherein the chemical activator is selected from the group consisting of: (a) phytic acid; (b) methylglycinediacetic acid, an alkali metal salt or ammonium salt thereof; (c) a water-soluble polyepoxysuccinic acid and an alkali metal salt or ammonium salt thereof; and (d) salicylic acid, ascorbic acid, tannic acid, and an alkali metal salt or ammonium salt of any of the foregoing; and (B) shutting in treatment zone for at least a sufficient time to allow the treatment fluid to in-situ form a solid gel at a design temperature for the method. According to another embodiment, a first treatment fluid comprising the aqueous silica sol and a second treatment fluid comprising the chemical activator can be introduced into the treatment zone separately, in any order, to then mix together and gel in-situ.

According to some embodiments of the invention, the silica sol can be combined or diluted with another fluid to form a treatment fluid before being introduced into a well bore. The well fluid is preferably water-based.

The particle size distribution of the silica sol is selected as described above. The silica sol is incorporated in an effective concentration and amount to effectively reduce the permeability of at least a portion of a treatment zone upon being placed into the subterranean formation and then chemically gelled. The effective concentration and amount may vary depending on factors such as the nature of the portion of the treatment zone for which the permeability is to be reduced and the like that will be appreciated by those of skill in the field. The concentration of silica sol depends on a number of factors, including the permeability of the treatment zone and the desired depth of penetration from the wellbore.

The method preferably includes, after introducing both the silica sol and the chemical activator, shutting in the treatment zone to allow time for the formation of the gel, and preferably, flowing back from the treatment zone.

Forming a Well Fluid

A well fluid can be prepared at the job site, prepared at a plant or facility prior to use, or certain components of the well fluid can be pre-mixed prior to use and then transported to the job site. Certain components of the well fluid may be provided as a "dry mix" to be combined with fluid or other components prior to or during introducing the well fluid into the well.

In certain embodiments, the preparation of a well fluid of the present invention can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Introducing into Well or Treatment Zone

Often the step of delivering a well fluid into a well is within a relatively short period after forming the well fluid, e.g., less within 30 minutes to one hour. More preferably, the step of delivering the well fluid is immediately after the step of forming the well fluid, which is "on the fly."

It should be understood that the step of delivering a well fluid into a well can advantageously include the use of one or more fluid pumps.

Shutting in the Treatment Zone

Preferably, after introducing the silica sol and the chemical activator into the treatment zone, the method includes the step of shutting in the treatment zone. The step of shutting in is preferably for a sufficient time at the design temperature for fully gelling the silica sol in situ.

Flow Back Conditions

In an embodiment, the step of flowing back is within 48 hours of introducing the silica sol and the chemical activator into the treatment. In another embodiment, the step of flowing back is within 24 hours. More preferably, if there is sufficient time for the gelling of the silica sol, the step of flowing back is within 8 hours of the step or steps of introducing.

After Well Treatment, Producing Hydrocarbon from Subterranean Formation

Preferably, after any well treatment according to the invention, a step of producing hydrocarbon from the subterranean formation is the desirable objective.

Silica Sol Applications in a Well

The invention can be used in producing wells or injection wells.

In an embodiment, the zone is a water-producing zone of a producing well. The method can be used to control water production from the zone, thereby promoting hydrocarbon production. In an embodiment, the methods can be used for reducing or shutting off water production from a zone in a well.

The amount of oil production may be monitored to determine if more silica sol should be added to the zone to block additional permeable areas and thus improve production. If needed, additional silica sol can be introduced into the treatment zone. This procedure may be repeated until the amount of silica sol is sufficient to achieve an acceptable water/oil ratio in production.

In an embodiment, the silica sol is introduced into one or more injection wells after termination of the production stage of the primary well. Secondary and/or tertiary flooding operations may also be performed by displacing one or more injectants into an injection well and through the reservoir to drive additional oil from the reservoir to the production wells. The presence of the fluid of the invention in the permeable zones serves to substantially block or seal the flow pathways of the injectants through the permeable zones. Preferably, the silica sol is introduced and gelled prior to the displacing injectants. Advantageously, displacing injectants do not prematurely pass through the permeable zones to the production wells before having been introduced through areas of the reservoir-containing oil.

When used in injection applications, the injectant can be any suitable fluid for causing movement of oil in the flow direction of the fluids as they pass from an injection well through a reservoir containing the oil to a production well. Examples of suitable injectants include fresh water, brine, and gases such as carbon dioxide. Preferably, an aqueous solution serves as both the carrier fluid and an injectant. The silica sol may be introduced to an injectant stream as it is being pumped into an injection well such that the injectant stream also acts as the carrier fluid for the swelling agent.

Examples

To facilitate a better understanding of the present invention, the following examples of certain aspects of some embodiments are given. In no way should the following examples be read to limit, or define, the entire scope of the invention.

Individual activators in specific concentration were mixed with nano silica sol and gelation time was evaluated at 200° F. and 300° F. The colloidal silica used in the examples is of 15% by weight. The particle size of colloidal silica used in the examples was about 20 nm. These activators show no precipitation with nano silica after mixing or at elevated temperatures. The system can effectively prevent water and gas flow in sandstone and carbonate formations with BHST up to 300° F. The gelation time can be controlled by adjusting the concentration of activator added to the nano silica. It gives a predictable and controllable pumping time, ranging from a few minutes to several hours at a given temperature. This is an important advantage of the present invention as it allows the sealant to remain pumpable for sufficient time for placement and develops the network structure that leads to gelation, over a predictable period of time. The set gel appears as a crystalline solid. It could remain homogenous and stay in place under confined conditions, such as fractures and pore spaces.

TABLE 1

12 nm nano silica with phytic acid activator

| Activator concentration in 200 mL solution | Temperature | pH of Mixture | Gelling Time |
|---|---|---|---|
| 15 mL | 200° F. | 8.0 | 6 hours |
| 5 mL | 300° F. | 9.5 | 50 minutes |

TABLE 2

12 nm nano silica with methylglycinediacetic acid activator

| Activator concentration in 200 mL solution | Temperature | pH of Mixture | Gelling Time |
|---|---|---|---|
| 1 gram | 200° F. | 10.8 | 4 hours |
| 1 gram | 300° F. | 10.8 | 50 minutes |

TABLE 3

12 nm nano silica with polyepoxysuccinic acid activator

| Activator concentration in 200 mL solution | Temperature | pH of Mixture | Gelling Time |
|---|---|---|---|
| 5 mL | 200° F. | 10.5 | 8 hours |
| 15 mL | 200° F. | 10.4 | 6 hours |
| 5 mL | 300° F. | 10.4 | 50 minutes |

Without being limited by any theory, it is believed that in the pH range of 5 to 7, because the concentration of hydroxide ions is lower, the system becomes deficient of a hydroxide catalyst for gelation. This ultimately results in low gelation time, below one hour, as can be seen in Table 4. Minimum gel time is exhibited in the range of 5 to 7. The increase in pH above 7 leads to surface ionization of silica particles that exhibit charge repulsion and results in increased gelation time.

TABLE 4

Effect of pH on gelation time of 12 nm nano silica with activator polyepoxysuccinic acid 1 gram at 200° F.

| pH | Gel Time |
|---|---|
| 10 | 8 hours |
| 7 | 1 hour |
| 5 | 30 minutes |

Preferred Activators for the Silica Sol System(s) of the Invention

All three activators, viz. phytic acid, methylglycinediacetic acid, polyepoxysuccinic acid that were evaluated for conformance control application have equal potential to block or seal the water and gas producing zones. However, based on the longer gelation times achieved at 200° F., the following preferred activator order can be followed: polyepoxysuccinic acid>phytic Acid>methylglycinediacetic acid.

Conclusion

The above invention describes a natural mineral introduced into a treatment zone of a well. In these kinds of treatments, there is no damage to the formation, which would otherwise occur with other synthetic treatments involving polymers. Hence, the novelty of this invention is also the environment friendly or green nature of the components of this approach.

Among other things, the method provides for controlling produced water. Gelled silica sol will selectively block or impede water flow in those zones of the formation through which water predominantly flows, leaving the hydrocarbon producing zones substantially unchanged.

Therefore, the present invention is well adapted to attain the ends and advantages mentioned as well as those that are inherent therein.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of composition or steps, other than as described in the claims.

What is claimed is:

1. A method of treating a treatment zone in a well to reduce the permeability of the treatment zone, the method comprising the steps of:

(A) introducing into the treatment zone a water-based treatment fluid comprising:
  (i) an aqueous silica sol; and
  (ii) a water-soluble chemical activator for gelling the silica sol, wherein the chemical activator is selected from the group consisting of:
    (a) phytic acid, an alkali metal salt or ammonium salt thereof;
    (b) methylglycinediacetic acid, an alkali metal salt or ammonium salt thereof;
    (c) a water-soluble polyepoxysuccinic acid and an alkali metal salt or ammonium salt thereof; and
    (d) salicylic acid, ascorbic acid, tannic acid, and an alkali metal salt or ammonium salt of any of the foregoing; and
(B) shutting in treatment zone for at least a sufficient time to allow the treatment fluid to in-situ form a solid gel at a design temperature for the method.

2. The method according to claim 1, wherein the silica sol is selected for having a silica particle size ranging between about 4 nanometers and about 100 nanometers have.

3. The method according to claim 1, wherein the silica sol is selected for having a silica particle size ranging between 4 and 22 nanometers.

4. The method according to claim 1, wherein the silica sol has a silica concentration in the range of about 1 percent to about 70 percent by weight.

5. The method according to claim 1, wherein the aqueous silica sol used to make up the treatment fluid has a pH in the range of about 9 to about 12.

6. The method according to claim 1, wherein the continuous aqueous phase of the water-based treatment fluid has a pH of at least 8.

7. The method according to claim 1, wherein the chemical activator is selected from the group consisting of:
  (a) phytic acid;
  (b) methylglycinediacetic acid;
  (c) a water-soluble polyepoxysuccinic acid; and
  (d) salicylic acid, ascorbic acid, and tannic acid.

8. The method according to claim 1, wherein the chemical activator is selected from the group consisting of:
  (a) phytic acid;
  (b) methylglycinediacetic acid; and
  (c) a water-soluble polyepoxysuccinic acid.

9. The method according to claim 1, wherein the chemical activator is a water-soluble polyepoxysuccinic acid.

10. The method according to claim 1, wherein the continuous aqueous phase of the water-based treatment fluid has an ionic strength less than 0.75.

11. The method according to claim 1, wherein the continuous aqueous phase of the water-based treatment fluid comprises dissolved divalent and multivalent cations in a total concentration that is stoichiometrically less than 50% that of the concentration of any first and second carboxylic acid functional groups of the chemical activator.

12. The method according to claim 1, wherein the continuous aqueous phase of the water-based treatment fluid comprises dissolved divalent and multivalent cations in a total concentration that is stoichiometrically less than 5% that of any first and second carboxylic acid functional groups of the chemical activator.

13. The method according to claim 1, wherein the continuous aqueous phase of the water-based treatment fluid comprises dissolved divalent and multivalent cations in a total concentration that is stoichiometrically less than 1% that of any first and second carboxylic acid functional groups of the chemical activator.

14. The method according to claim 1, wherein the chemical activator does not thermally hydrolyze or thermally decompose at a particular design temperature for the method of treating to release an acid or base.

15. The method according to claim 1, wherein the treatment fluid does not include any hydraulic cement.

16. The method according to claim 1, wherein the treatment zone includes a portion of a subterranean formation having a permeability greater than 1 milliDarcy.

17. The method according to claim 1, wherein the treatment zone includes a proppant pack or gravel pack.

18. The method according to claim 1, wherein the treatment zone is a water-producing zone.

19. The method according to claim 1, further comprising, after the step of introducing the second treatment fluid comprising the chemical activator, the step of shutting in the treatment zone for at least one hour with the chemical activator with the silica sol.

20. A method of treating a treatment zone in a well to reduce the permeability of the treatment zone, the method comprising the steps of:
(A) introducing into the treatment zone, in any order:
  (i) a first treatment fluid comprising an aqueous silica sol; and
  (ii) a second treatment fluid comprising a water-soluble chemical activator for gelling the silica sol, wherein the chemical activator is selected from the group consisting of:
    (a) phytic acid;
    (b) methylglycinediacetic acid, an alkali metal salt or ammonium salt thereof;
    (c) a water-soluble polyepoxysuccinic acid and an alkali metal salt or ammonium salt thereof; and
    (d) salicylic acid, ascorbic acid, tannic acid, and an alkali metal salt or ammonium salt of any of the foregoing; and
(B) shutting in treatment zone for at least a sufficient time to allow the treatment fluid to in-situ form a solid gel at a design temperature for the method.

* * * * *